Figure 2A:
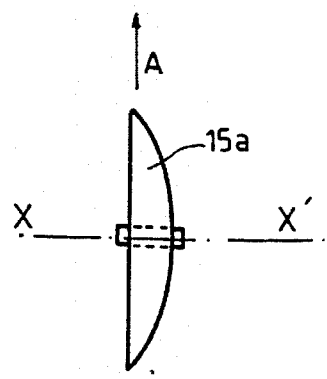

United States Patent [19]

Whitesel et al.

[11] Patent Number: 5,531,171
[45] Date of Patent: Jul. 2, 1996

[54] LIQUID PRODUCT DEVICE

[75] Inventors: J. Warren Whitesel, Entrammes; Gabriel Desbois, Malestroit, both of France

[73] Assignee: Etablissements Mauguin SA, France

[21] Appl. No.: 307,477

[22] Filed: Sep. 16, 1994

Related U.S. Application Data

[63] Continuation of Ser. No. 962,392, Oct. 16, 1992, abandoned.

[30]     Foreign Application Priority Data

Dec. 9, 1991 [FR] France .................................. 91 15403

[51] Int. Cl.⁶ .......................... A01C 23/02; A01B 15/16; A01B 49/02
[52] U.S. Cl. ...................... 111/121; 172/604; 172/149; 172/175; 172/763; 172/773; 172/740
[58] Field of Search .................................. 111/118, 120, 111/121, 123, 124, 163, 149, 157, 164, 166–169, 191–193, 162; 172/4.5, 740, 604, 739, 142, 145, 149, 151, 174, 175, 180, 181, 194, 762, 763, 773

[56]                References Cited

U.S. PATENT DOCUMENTS

| | | | |
|---|---|---|---|
| 48,441 | 6/1865 | Roce | 111/157 |
| 640,553 | 1/1900 | Fowle | 111/167 |
| 927,277 | 7/1909 | Peterson | 172/604 |
| 1,444,224 | 2/1923 | Washer | 172/604 |
| 1,821,829 | 9/1937 | Coe et al. | |
| 2,240,994 | 5/1941 | Love | 172/684 |
| 2,442,727 | 6/1948 | Hyland | 111/168 |
| 2,489,385 | 11/1949 | Paul | |
| 3,010,744 | 11/1961 | Hollis | 172/740 |
| 3,292,562 | 12/1966 | Clark | 111/123 |
| 3,799,079 | 3/1974 | Dietrich | 111/7 |
| 3,946,681 | 3/1976 | Sylvester | 111/124 |
| 4,018,170 | 4/1977 | vander Lely et al. | 111/120 |
| 4,408,551 | 10/1983 | Keller et al. | 111/157 |
| 4,461,355 | 7/1984 | Peterson et al. | 111/124 |
| 4,538,532 | 9/1985 | Coker | 111/121 |
| 4,596,200 | 6/1986 | Gafford et al. | 111/193 |
| 4,656,957 | 4/1987 | Williamson et al. | 111/121 |
| 4,773,340 | 9/1988 | Williams et al. | 111/124 |
| 4,872,412 | 10/1989 | Zollinger | 111/121 |
| 4,947,770 | 8/1990 | Johnston | 111/121 |
| 4,986,200 | 1/1991 | Johnston | 111/121 |
| 5,027,724 | 7/1991 | Ptacek et al. | 111/121 |
| 5,033,397 | 7/1991 | Colburn, Jr. | 111/118 |
| 5,272,992 | 12/1993 | Barbour et al. | 111/120 |
| 5,309,852 | 5/1994 | Zimmerman | 111/121 |

FOREIGN PATENT DOCUMENTS

| | | |
|---|---|---|
| 322941 | 11/1989 | European Pat. Off. . |
| 438187 | 7/1991 | European Pat. Off. . |
| 1135089 | 11/1968 | United Kingdom . |

Primary Examiner—Spencer K. Warnick, IV
Attorney, Agent, or Firm—Laff, Whitesel, Conte & Saret, Ltd.

[57]                ABSTRACT

A plurality of digging devices are mounted side by side on the same beam which is coupled to a clamping system of a vehicle or of a tank containing the liquid to be buried. Each device comprises, mounted on the same chassis, at least a disk for forming and opening a furrow on the ground surface. The liquid to be buried is injected into the opened furrow and then it is covered after the injection. The disk (15) has at least one convex face. The disk (15) is mounted to stand almost vertical with its axis of rotation, in an almost horizontal location which is perpendicular to the forward moving direction of the device. The clamping system is designed to exert a vertical downward force on the disk (15).

6 Claims, 4 Drawing Sheets

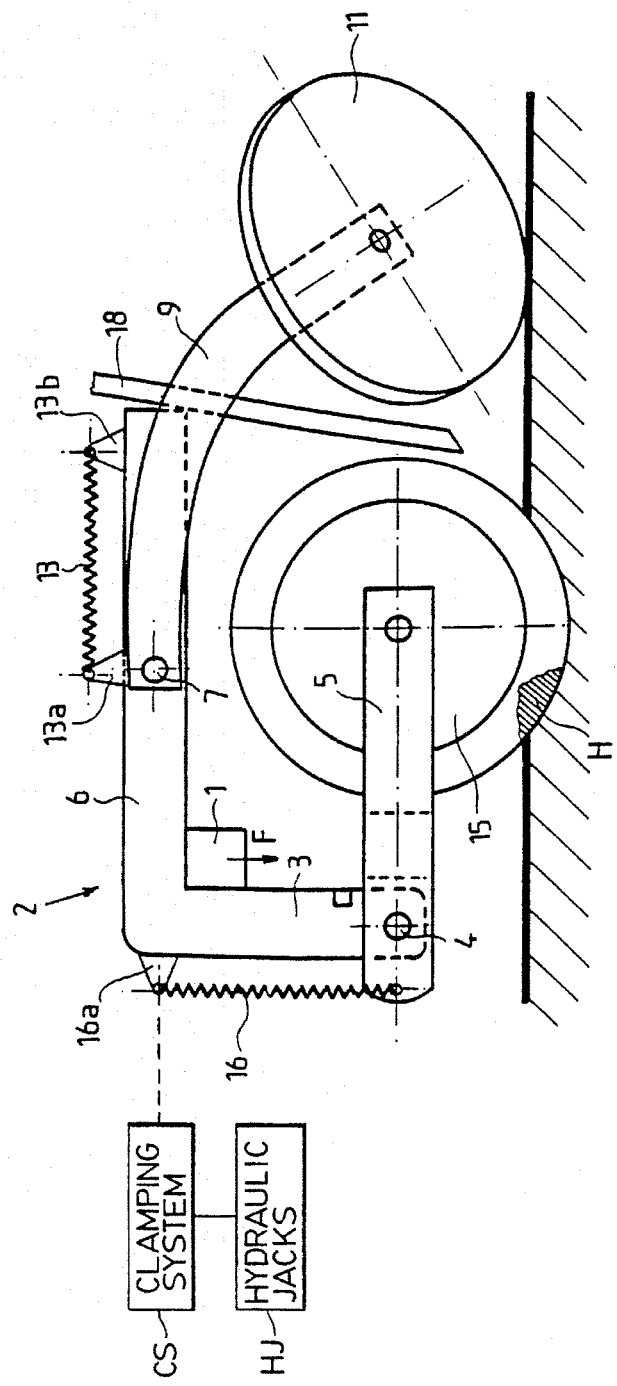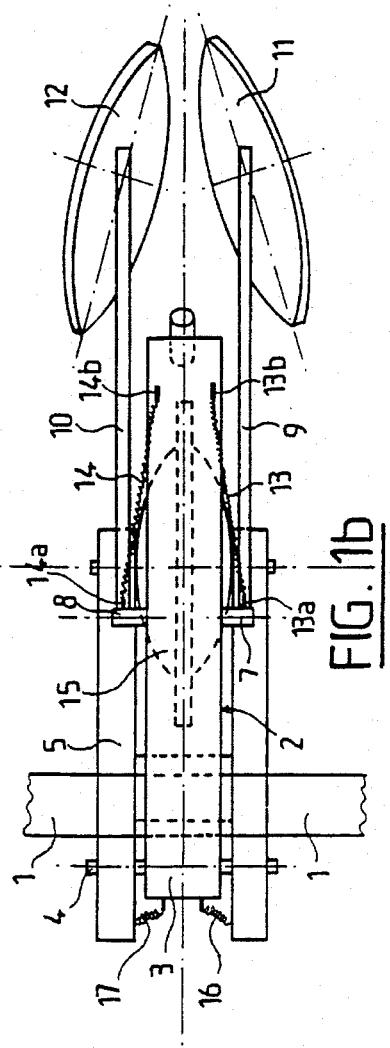
FIG. 1a
FIG. 1b

LIQUID PRODUCT DEVICE

This application is a continuation of application Ser. No. 07/962,392, filed Oct. 16, 1992 now abandoned.

The invention concerns a digger for liquid products such as manure, magnegenous or ammoniated liquids, liquid sludge, etc. A digger of this type is usually composed of several digging devices mounted side by side and coupled to a clamping system of a vehicle or a tank containing the liquid to be buried.

Diggers, consisting of several digging devices, are already known; reference is, for example, made to the patent EP-A-322 941.

A liquid product digger is fixed to the back of a tank containing the liquid to be buried. A digging device is usually made up of means, mounted on the same chassis, for opening a furrow on the ground surface, means for injecting the liquid to be buried in the furrow opened by said forming means and means for covering said furrow up again. Usually, the furrow opening means consist of two disks opened in the shape of a "V" and the injection means of a colter connected to the tank for feeding the liquid to be buried.

Known diggers have the disadvantage that the disks opened in a "V" and the colters exert a resistance to moving forward, which translates into a double effect. On the one hand, this resistance constitutes a consuming element of traction power and, on the other hand, it is the center of a force which tends to lower the back of the tank and, as a result, reduces the traction of the vehicle which pulls the tank. Due to this, the vehicle has a loss in grip.

Moreover, diggers with disks opened in the shape of a "V" have, by necessity, a space between the digging devices which is too considerable because it is greater than an ideal distance for the plants which absorb the elements carried by the liquid product. In fact, when the distance between the digging devices is too great, the liquid fertilizer is buried along parallel strips in direction of the forward movement of the digger. This results in uneven plant growth which is then waste.

Finally, a device of the above-described type only operates on relatively soft terrain, for example on prairies or tilled land.

The object of the invention is to provide a digging device which does not have the above-noted disadvantages.

Thus, the object is to provide a digger which, on the one hand, when in operation, exerts a lower tractive resistance than diggers of the prior art, and, on the other hand, indirectly exerts a supporting force on the back wheels of the vehicle which draws the tank and digger. In addition, the digging devices making up this type of a digger are spaced relatively closer than those of diggers of the prior art, and it can be used on any terrain.

This object is attained by implementing the combination of means defined in claim 1. Preferred features are noted in the dependent claims.

Figure 2B:
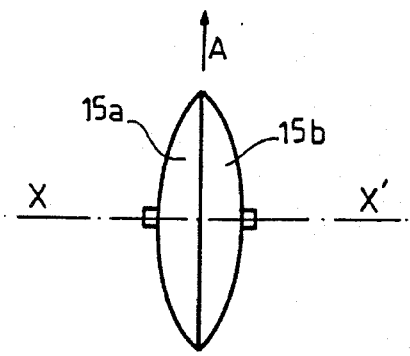
Figure 2C:
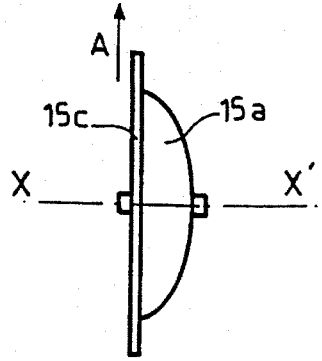
Figure 2D:
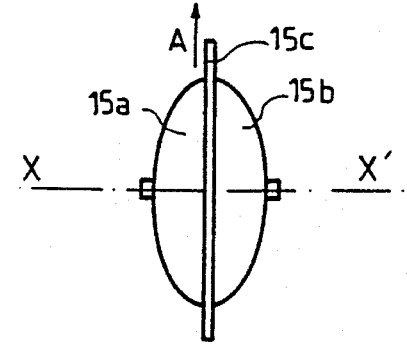
Figure 3:
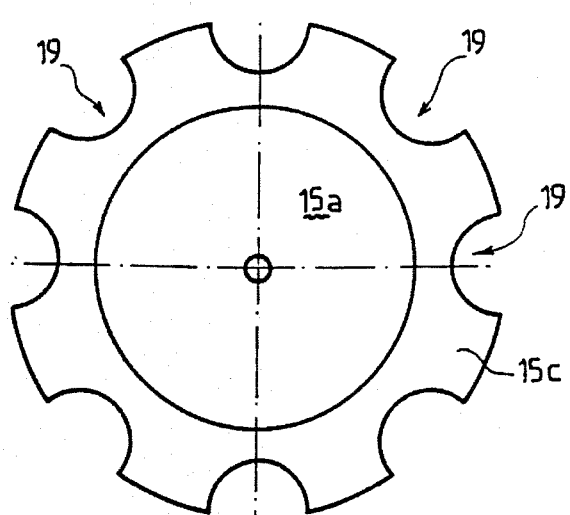
Figure 4:
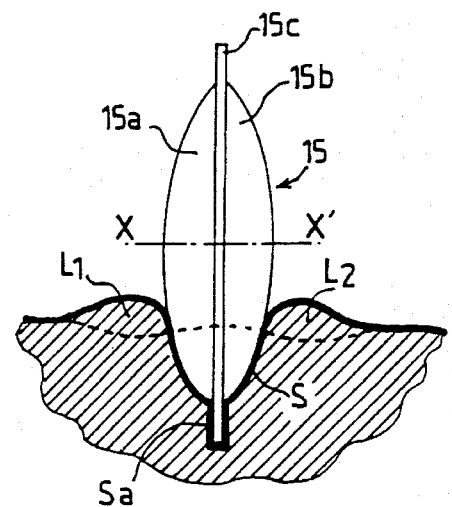
Figure 5:
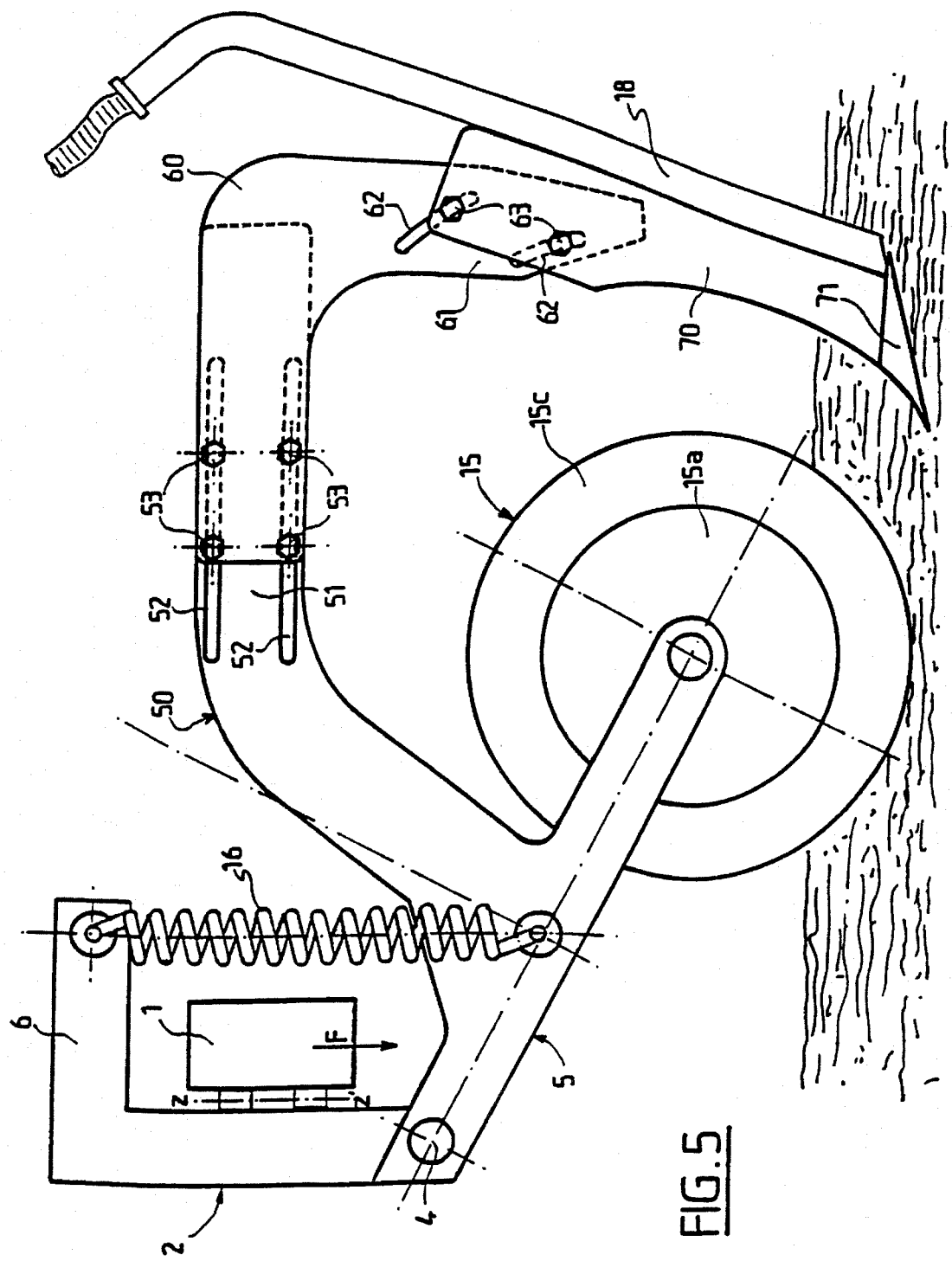
Figure 6:
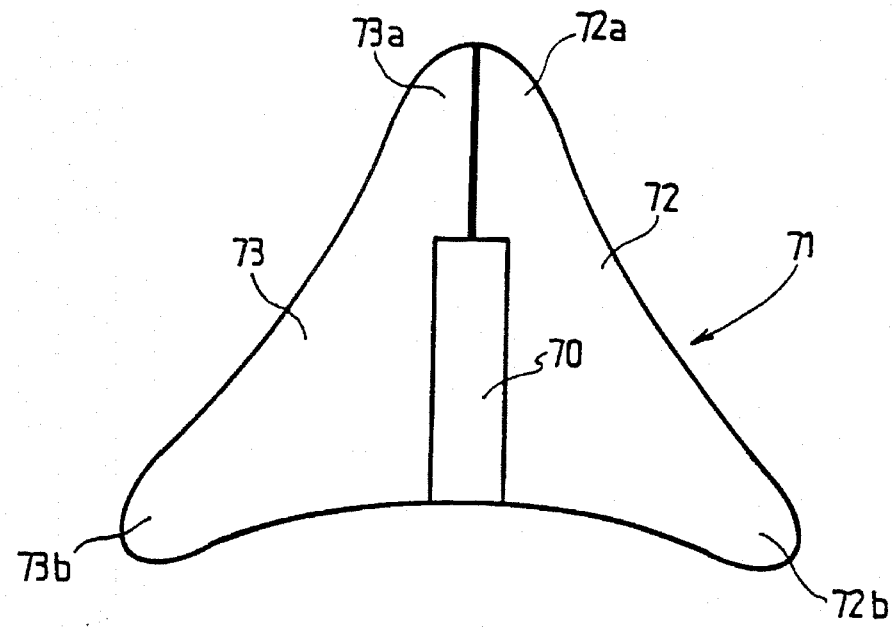
Figure 7:
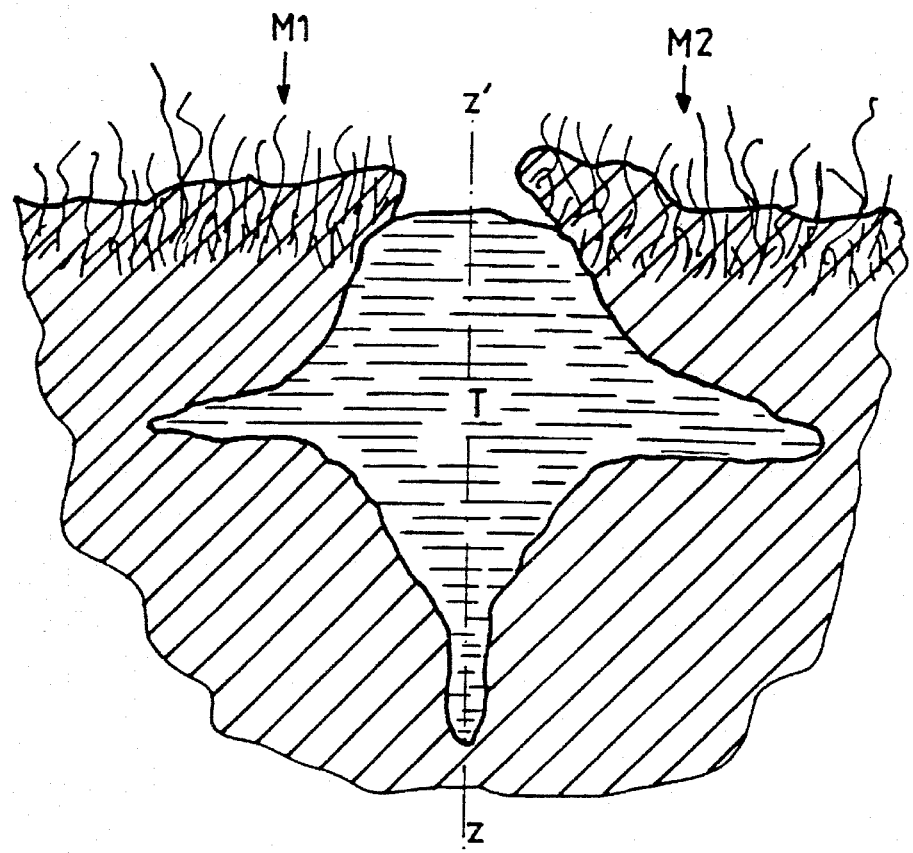

These features, as well as others, become clearer on reading the following description of two embodiments, said description being made in association with the attached drawings, among which:

FIGS. 1a and 1b are, respectively, front and back views of a digging device of a digger according to a first embodiment of the invention, FIGS. 2a to 2d are front views showing the embodiments of the disk made up of the furrow-forming means of a digging device according to the invention, FIG. 3 is a side view showing the notches which a disk of a digging device according to the invention has, FIG. 4 shows the section of a furrow formed by a disk of a digging device according to the invention, FIG. 5 is a side view of a digging device of a digger according to a second embodiment of the invention, FIG. 6 is a top view of a plowshare with a delta-wing shape which can equip a digging device according to the second embodiment and FIG. 7 shows a section of a furrow formed by a disk and a plowshare of a digging device according to the second embodiment of the invention.

The digging device shown in FIG. 1 is held by a transverse beam 1 attached to a three-point type clamping system CS at the back of a tank containing the liquid to be buried. In reality, this beam 1 supports a certain number of digging devices situated side by side and identical to the one described here, together forming a digger. This number can be between 4 and 12. The clamping system on the tank is also designed so as to be able to exert, with the help of appropriate hydraulic jacks HJ, a vertical downward force (arrow F) on the beam 1 and, as a result, on each digging device.

Each digging device is essentially made up of a chassis 2 in the form of a square fixed on the beam 1 and provided, at the lower end of its vertical flange 3, with a swivel axis 4 about which an arm 5 pivots. On the upper horizontal flange 6, the second swivel axes 7 and 8 are provided around which two arms 9 and 10, respectively, pivot independent of one another, symmetrically in relation to the longitudinal axis of the chassis 2 and each side of this chassis 2.

Each arm 9, 10 is provided, at its lower end, with a fill-in wheel 11, 12 inclined in relation to the vertical and inclined in relation to the longitudinal axis of the digging device. The inclinations in relation to the vertical and in relation to the longitudinal axis are, for example, between 10° and 30°. The fill-in wheels 11 and 12 form, seen from above, a "V" opened toward the front of the device and, seen from the back, a "V" opened upward.

The fill-in wheels 11 and 12 are designed so as to be able to roll on the ground. Each arm 9, 10 is provided with a return system 13, 14 which tends to push the corresponding wheel 11, 12 against the ground. This system consists, for example, of a return spring, one end of which is attached to an interdependent clip 13a, 14a of the corresponding arm 9, 10 and the other end is attached to an interdependent clip 13b, 14b of the horizontal flange 6 of chassis 2.

At the free end of arm 5, means for opening a furrow are provided, in a vertical plane containing the longitudinal axis of the digging device, comprised of a disk 15 described in detail below. A return system 16, 17, for example, consisting of a return spring (or two return springs 16 and 17), one end of which is attached to an end of arm 5 and the other end to an interdependent clip 16a of chassis 2 is intended to play the role of shock absorber for the disk 15.

An injection tube 18 is provided at the back of the disk 15 and connected to a tank (not shown) containing the liquid to be buried. The lower end of the injection tube 18 is found in the longitudinal axis of the digging device, at the back of the disk 15.

FIGS. 2a to 2d show disks 15 for opening a furrow according to the invention.

According to a first embodiment (FIG. 2a), the disk 15 is made up of a simple convex disk 15a, the axis of rotation xx' of which is horizontal and at a right angle in relation to the forward moving direction (arrow A) of the functioning device.

According to a second embodiment, it comprises two convex disks 15a and 15b, the concave faces of which are, respectively, turned toward one another (FIG. 2b).

According to a third embodiment, it comprises a single convex disk portion 15a the concave face of which is turned toward a flat disk portion 15c and which is in contact with it (FIG. 2c).

According to a fourth embodiment, it is made up of two convex disks 15a and 15b between which a flat disk 15c is mounted. The convex disks 15a and 15b have their concave faces turned toward one another and enclose the flat disk 15c.

In these embodiments, the axis of rotation xx' of disk 15 is horizontal and at right angles in relation to the forward moving direction A of the digging device.

We shall now describe the operation of a digging device provided with a disk 15 which is formed according to the fourth embodiment (FIG. 2d). With the exception of some special points, this mode of operation is the same for the other embodiments.

By means of the jack or jacks of the three-point type clamping system at the back of the tank which contains the liquid to be buried, a vertical thrust force F is exerted on beam 1, a force which is transmitted, via the return system 16, to the disk 15 in such a way that it penetrates the ground to a desired depth. The convex shape of the disk 15 facilitates this penetration.

Given the shape of the disk (15), the depth and the size of the furrow are an increasing function of the intensity of force F.

By penetrating the ground, the disk 15 is creating a furrow S (FIG. 4) which is provided, on each side, with two lips L1 and L2. The liquid to be buried is injected into this furrow S, in a predetermined quantity, by means of the injection tube 18. The fill-in wheels 11 and 12 are in such a position that they then push away, by shifting, the lips L1 and L2 into the furrow S and cover it again after injection.

Because of the special shape of the disk 15, the resistance to the forward movement of each digging device is reduced. On the one hand, this means that a reduced traction power can be sufficient for the vehicle which is carrying the tank and the digger. On the other hand, due to the fact that a downward vertical force is exerted on each digging device, in reaction, the back of the tank has the tendency to rise, thus transferring the load on its coupling and then on the rear wheels of the carrier vehicle. Its grip on the ground is thus improved.

Moreover, each digging device occupies minimal transverse space and it is possible, on a digger, to bring two adjacent devices closer together so that the distance which separates them is almost equal to an ideal distance for the plants.

If an obstacle, such as a stone or a root appears in the path of the disk 15, the arm 5 rises, the disk 15 passes over it and, returned by the return system 16, goes back to its initial position. Arms 9 and 10 and their return systems 13 and 14 play the same role for the fill-in wheels 11 and 12. The two arms 9 and 10 being independent, each device can adapt to the unevenness of the ground.

In this respect, a digging device according to the invention has a certain advantage in relation to those of the prior art. In effect, an obstruction is no longer the cause of parts breaking, parts that users of diggers of the prior art were obliged to replace in order to continue to work.

It will be noted that the penetration forces of the disks 15 according to the four embodiments described above increase, beginning with the embodiment of FIG. 2a to the embodiment of FIG. 2d.

In the embodiments of FIGS. 2c and 2d, the function of the flat disk 15c is to cut a ditch Sa in the ground, with the part which is the furthest in front of the disk 15 (hatched zone H in FIG. 1 ), even though the convex disk 15a or disks 15a and 15b open this ditch in order to form the furrow with one lip or two lips L1, L2. It is noted that a single wheel 12 covering the ground again can be sufficient in the embodiments of FIGS. 2a and 2c.

It will be seen that the flat disk 15c, as well as creating only a low-capacity furrow Sa, contributes to a notable increase in the exchange surface, a surface which corresponds to the overall surface of the ditch S and furrow Sa.

Also shown in FIG. 4, by a dotted line, is the section of the furrow which has been covered again by the fill-in wheels 11 and 12.

In the two last embodiments, the flat disks 15c with notches 19 could be used to further facilitate the penetration of disk 15 in the ground, in particular, in unworked ground.

Another embodiment of a digging device according to the invention is shown in FIG. 5. In this figure, the same parts as those of FIG. 1 have the same reference numbers.

Thus, the device shown is carried by a transverse beam 1, whose clamping system to the tank is designed so as to exert a vertical downward force (arrow F) on the beam 1.

A chassis 2 is mounted on beam 1 so as to be able to pivot about a vertical axis zz' by an angle of approximately more or less ten degrees about the longitudinal axis of the digger. Abutments (not shown) can be provided to limit this pivoting movement.

An arm 5 is designed so as to pivot about a swivel axis 4. On the free end of arm 5, a disk 15 is mounted which has the structure of one of those shown in FIGS. 2a to 2d. It was, however, found that the structure of FIG. 2d, with a flat disk 15c enclosed between two convex disks 15a and 15b, gives better results.

A return compression spring 16 is provided between the upper vertical flange 6 of chassis 2 and arm 5.

Arm 5 is provided with a beam 50 extended toward the back by a horizontal part 51. This latter part is provided with two parallel oblong holes 52 between them and horizontally directed toward the back. Holes 52 are intended to receive bolts 53 provided for attaching a square 60.

The arm 5 has its back part 61 which is vertical and directed toward the ground. Part 61 comprises oblong holes 62 bored almost vertical in the arc of a circle. The holes 62 are intended to receive bolts 63 provided for attaching a foot 70. The injection tube 18 is mounted on the back of the foot 70, coupled to it, the outlet of said tube being almost at the level of the lower part of foot 70.

A plowshare 71 in the shape of a delta-wing or crow's foot is soldered to the lower part of foot 70. This plowshare 71 is shown in a top view in FIG. 6. It comprises two flanges 72 and 73 in the shape of a triangle. The front parts 72a and 73a of flanges 72 and 73 form the front part of the plowshare 71 and are found at a lower level than that of the back parts 72b and 73b. The latter are almost at the level of the bottom part of foot 70.

As can be seen, the foot 70 and plowshare 71 combination can be advanced or moved back almost horizontally in relation to the disk 15, making the square 60 slide horizontally in relation to the beam 50 of arm 5. This is made possible by the oblong holes 52.

Similarly, foot 70 and plowshare 71 can be lowered or raised in relation to the disk 15 by means of oblong holes 62. In view of the fact that the holes 62 have the shape of an arc of a circle, the foot 70 and plowshare 71 combination pivot slightly, at the same time as this vertical control movement, according to a transverse horizontal axis situated in front of foot 70.

It will be noted that foot 70 and the axis of symmetry of plowshare 71 are in the same plane as that which contains disk 15.

The digger of FIG. 5 functions as follows.

The non-convex part 15c of disk 15 opens, by pushing away the earth, a smaller-sized furrow, in the order of a few millimeters, and cuts, in a way, the upper part of the ground, the part which can be green. The convex parts 15a and 15b of disk 15 enlarge the furrow thus formed.

Plowshare 71 which, when operating, is at a depth in the order of ten to twenty centimeters, opens a ditch T (FIG. 7) which is underground. Due to its delta-wing or crow-foot shape, plowshare 71 raises the plant lumps M1 and M2 which are located on each side of the axis zz' of the furrow opened by the disk 15, the result of which is that it opens the upper part of ditch T. The manure is then deposited in the ditch by means of the injection tube 18. After the tube 18 has passed, the plant lumps, no longer supported by the plowshare 71, fall back into their initial position and close the ditch T. It can be seen that this process leaves the ground with almost no trace of digging.

The size of plowshare 71 is in the order of 20 to 30 centimeters. It therefore also ensures, at the level of ditch T, a decompacting of the earth which facilitates the diffusion of the manure and allows a homogenization of the burying on the prairie. For this reason, the plants all receive a regular supply of fertilizers which eliminates the disadvantages of the growth in waste usually seen when using diggers of the prior art.

It should be noted that the digger of FIG. 5 can be used on any type of terrain: ground covered with haulms or stubble, natural or artificial prairies, etc. Depending on the type of terrain being dug, the position is regulated relative to the foot 70 and plowshare 71 in relation to disk 15.

The fact that chassis 2, which supports arm 5, is mounted so as to pivot on beam 1, enables disk 15 and plowshare 71 to avoid obstacles, such as stones, roots, etc. and prevents damage to these tools.

We claim:

1. An apparatus for injecting fertilizer products into a vegetated surface of the earth without appreciably disturbing said vegetation, said apparatus comprising a beam clamped to a vehicle or tank containing a fertilizer to be buried, means for mounting a plurality of digging devices (2) side by side on said beam, said means for mounting having an L-shaped member pivotally connecting said digging device to said beam at a vertical leg of said L-shaped member, each of said devices (2) comprising a disk (15) having at least one convex face, said disk (15) being oriented to rotate in substantially a vertical plane, an axis of said disk rotation being substantially horizontal and perpendicular to the direction of a forward movement of said device, means for applying an almost vertical downward force on the disk (15) of each of the said devices, each of said devices (2) also comprising only one almost vertical foot (70) in a plane which is substantially the same plane which contains the disk (15), said foot 70 having a delta wing plowshare (71), mounted at its lower end, said foot (70) being within the ground when the device is operating, a tube (18) attached behind said foot (70), for injecting said fertilizer via said tube (18) behind said foot (70), said tube (18) having an outlet at approximately an upper level of the delta wing plowshare (71), said disk (15) opening a furrow on the vegetated surface and the foot (70) widening said furrow for injecting said fertilizer and said furrow closes after said injection by gravity, and means for mounting the foot (70) and plowshare (71) combination to slide from front to back in relation to the disk (15).

2. Apparatus for injecting liquid products into the surface of a vegetated surface of the ground without appreciably disturbing said vegetation, said apparatus comprising a plurality of liquid injection devices (2), a beam (1) adapted to be coupled to a vehicle having a tank containing a liquid to be injected, said plurality of injection devices (2) mounted side by side on said beam (1), each liquid injection device (2) comprising a disk (15) located in a vertical plane with its rotational axis being horizontal and perpendicular to the moving direction of said apparatus, said disk (15) comprising first and second convex portions (15a, 15b) facing and abutting each other, a single flat disk (15c) positioned between said first and second convex portions, said disk (15) being provided for cutting into said vegetated surface and forming a furrow with lips of raised earth on each side of the disk, a plowshare (71) mounted behind said disk (15) at the lower end of a foot (70), said plowshare (71) having laterally extending projections (72b, 73b) forming a delta-wing, said plowshare (71) being located in the ground during an injection of said liquid for widening said furrow, the lips of raised earth on each side of the furrow formed by the disk falling down and closing a furrow trench formed by said disk after said plowshare passes, a tube (18) mounted immediately adjacent and behind said foot (70) and having an outlet at approximately an upper level of the plowshare (71) so as to inject said liquid in the furrow opened by said disk and widened by said plowshare, means for exerting a downwardly acting vertical support force on each disk of each device, a substantially horizontal telescoping beam (50, 60) connecting said foot (70) to said disk (15), and spaced parallel elongated slots (51, 52 and 62, 63) for locking a selected length of said horizontal beam and the distance between said foot and disk.

3. The device of claim 2 wherein said horizontal telescoping beam has a rear vertical section (61) associated therewith, said foot (70) being adjustably attached to said vertical section (61), and a pair of concentric elongated arcuate slots (62, 62) in an area of said adjustable attachment between said horizontal telescoping beam (50, 60) and said foot (70) for adjusting the vertical depth and angle of attack of said delta wing plowshare (71).

4. Apparatus for injecting liquid products into the surface of a vegetated surface of the ground without appreciably disturbing said vegetation, said apparatus comprising a plurality of liquid injection devices (2), a beam (1) adapted to be coupled to a vehicle having a tank containing a liquid to be injected, means for mounting said plurality of injection devices side by side on said beam (1), said means for mounting having an L-shaped member pivotally connecting said digging device to said beam at a vertical leg of said L-shaped member, each liquid injection device comprising a disk (15) located in a vertical plane with its rotational axis being horizontal and perpendicular to the moving direction of said apparatus, said disk (15) comprising first and second convex portions (15a, 15b) facing and abutting each other, a single flat disk (15c) positioned between said first and second convex portions, said disk (15) being provided for cutting into said vegetated surface and forming the earth into a furrow with lips of raised earth on each side of the disk, a plowshare (71) mounted behind said disk (15) at the lower end of a foot (70), said plowshare (71) having laterally extending projections (72b, 73b) forming a delta-wing, said plowshare (71) being located in the ground during an injection of said liquid for widening said furrow, the lips of raised earth on each side of the furrow formed by the disk falling down to close said furrow after said plowshare passes, and a tube (18) mounted immediately adjacent and behind said foot (70) and having an outlet at approximately an upper level of the plowshare (71) so as to inject said liquid in the furrow opened by said disk and widened by said plowshare, and means for exerting a downwardly acting vertical support force on each disk of each device.

5. The liquid injection apparatus according to claim 4, and means for mounting the foot (70) and plowshare (71) combination to slide from front to back in relation to the disk (15).

6. The injection apparatus according to claim 4 and means (Z-Z', 4) for mounting the device (2) to move almost vertically by carrying out a pivoting movement around a horizontal and transverse axis (4) situated in front of said device (2).

* * * * *

UNITED STATES PATENT AND TRADEMARK OFFICE
CERTIFICATE OF CORRECTION

PATENT NO. : 5,531,171
DATED : July 2, 1996
INVENTOR(S) : J. Warren Whitesel, Gabriel Desbois It is certified that error appears in the above-indentified patent and that said Letters Patent is hereby corrected as shown below:

On the title page item [75],
Inventor's name, delete "J. Warren Whitesel" and insert --Jean Mauguin--.

Signed and Sealed this

Seventeenth Day of September, 1996

Attest:

BRUCE LEHMAN

Attesting Officer     Commissioner of Patents and Trademarks